United States Patent Office 3,266,759
Patented August 16, 1966

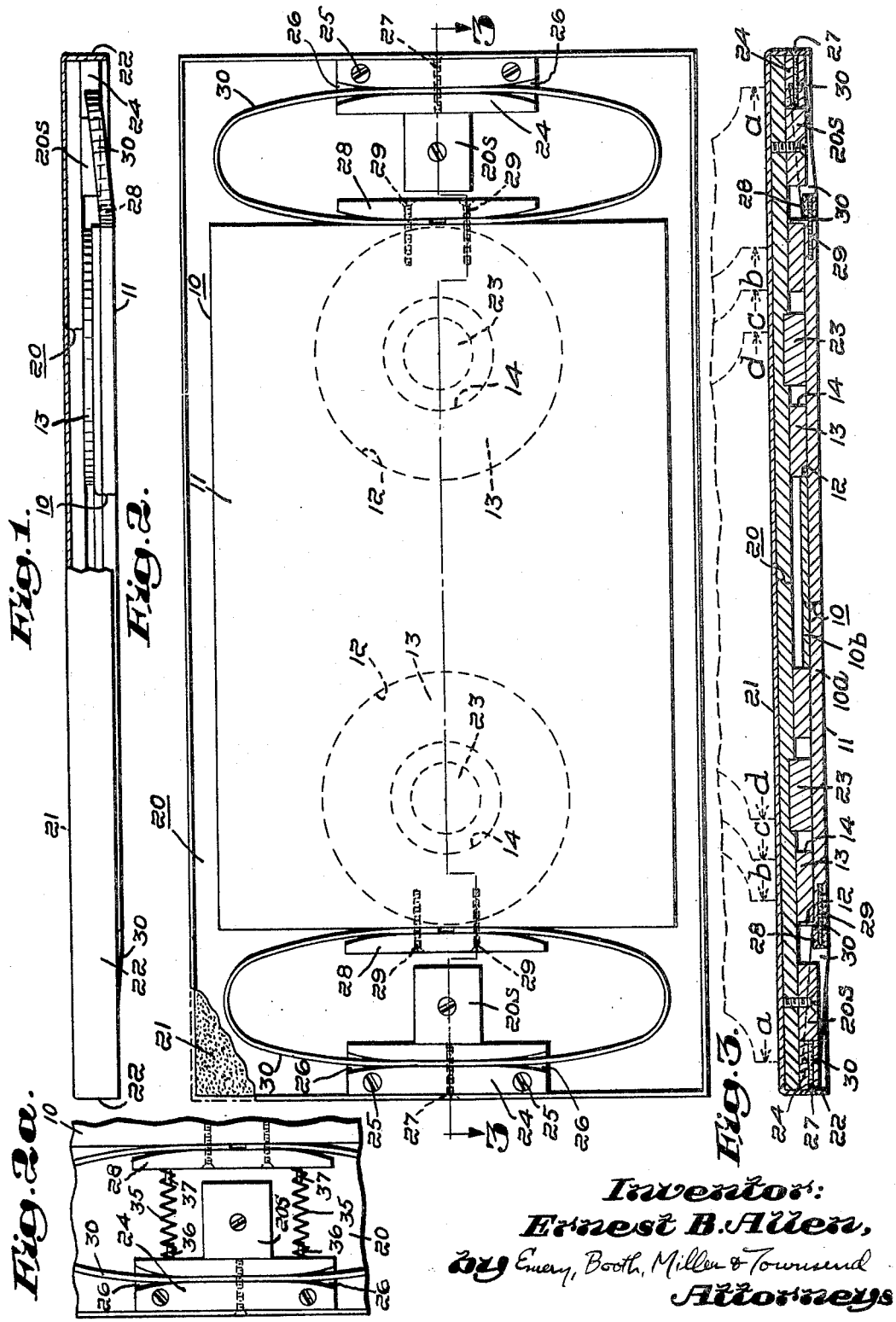

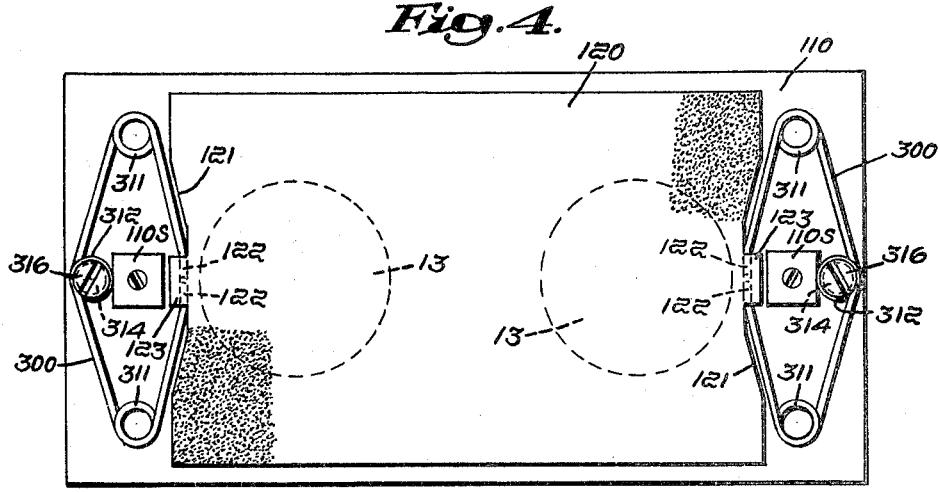
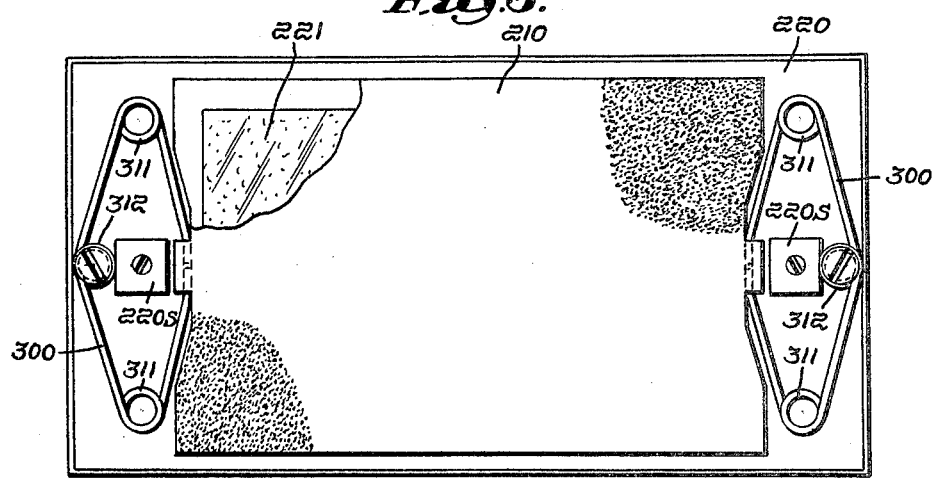
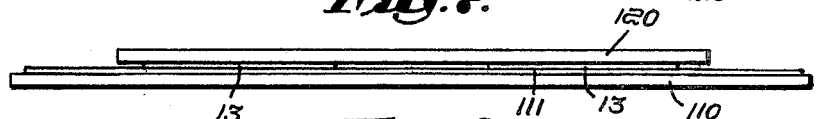
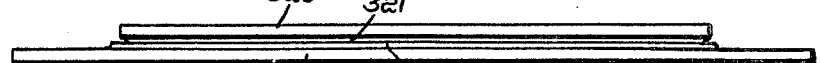
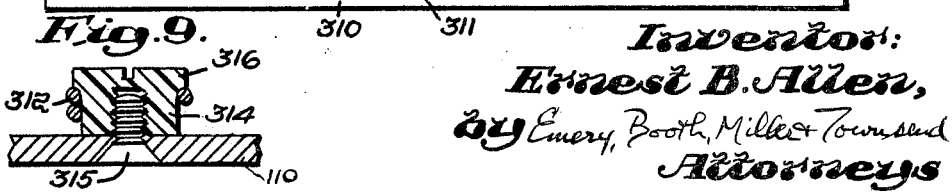

3,266,759
VIBRATION CONTROLLING MOUNT
Ernest B. Allen, 33 Parkinson St., Needham, Mass.
Filed Dec. 13, 1963, Ser. No. 330,452
2 Claims. (Cl. 248—20)

My present invention concerns the control, damping and neutralizing or isolating of actual and incipient vibrations as between a supporting sub-structure such as a floor, platform or other relatively fixed base and a load thereon that is subject to more or less regular operational impulses and shock, as for example a non-circular loom operatively located upon a weave-shed floor.

Supporting devices or mounts of this class are variously termed vibration controllers, neutralizers and isolators, their function being to counteract and absorb the recurrent vibrations originating in the load and so to minimize the objectionable effects of the transmitting thereof to the supporting sub-structure.

Such devices have generally included a bottom or base element to be fixed upon the floor or other foundation, a top element receiving the load, and interposed resilient means usually in the form of coil springs or of rubberous and like compressible elastic masses. These have been found unduly heavy or massive, relatively short-lived and not easily replaceable without prolonged interruption of operation of the supported apparatus or machine.

Accordingly it is a primary object of the present invention to provide new and improved devices of the class described, of a simplified, inexpensive, easily installed and replaceable nature, of maximum vibration absorptive capacity with regard to the limited area and especially the low height and generally flat form of the device and the absence of projections at the top thereof. In carrying out the mentioned objectives the invention includes the devising of special spring structures along with novel provisions for replaceable operative assembly thereof with the main supporting or plate elements of the devices, together with various improved spring-correlating features as well as bearing surface means for said plate elements.

Other features and advantages will be apparent from the following description in connection with the drawings showing illustrative embodiments of the device and wherein:

FIG. 1 is a side elevation of one vibration controlling unit in accordance with the invention;

FIG. 2 is a bottom plan view of the same;

FIG. 2a shows a modification as at the central left portion of FIG. 2;

FIG. 3 is a longitudinal section on the line 3—3 of FIG. 2, with the position of supported parts of different loads, such as the feet of loom frames, indicated in dotted lines;

FIG. 4 is a top plan of another embodiment of the invention where the top or load-seating plate is of lesser area than the bed plate;

FIG. 5 is a bottom plan, similar to FIG. 2, showing a further modification as to the interposed bearing means;

FIG. 6 is a side elevation corresponding to FIG. 5, showing the unit in use position with the bed plate lowermost but prior to installation of the spring means and anchor elements omitted merely for clarity;

FIG. 7 is a similar side elevation of the unit of FIG. 4 in use position;

FIG. 8 is a similar side elevation of a further modification as to certain interposed wear-resistive bearing surface elements; and FIG. 9 is a detail sectional view of a spring anchoring element.

Each device or unit of the invention consists essentially of a pair of superimposed flat plates having capacity for relative movement in the plane thereof and variously resiliently limited as to the extent of such movement so as to minimize the vibrational thrust effects in all horizontal directions upon the underlying sub-structure.

Considering first more particularly FIGS. 1 to 3, the vibration control unit as there illustrated comprises a flat generally rectangular bed plate 10 and a flat overlying parallel load-receiving or seat plate 20. These may be one-piece plate elements cut, died or otherwise formed from a good grade of carbon steel sheet stock of corresponding thickness. The plates have a determined area for the particular support purposes, and are of a minimum thickness consistent with appropriate strength and rigidity in relation to the contemplated weight to be supported. Alternatively the bed plate 10 may be fashioned of two initially separate sheet steel members 10a and 10b placed flatwise on and integrally united to each other. Such construction facilitates the formation of certain bearing seats 12, 12 in one of the plates, to be referred to.

The under face 11 of the lower element or bed plate 10 is roughened, serrated, pebbled or otherwise formed as by coating or plying with a coarse abrasive layer, adapting the plate when under load to grip the floor or other sub-structure in operatively fixed anchorage thereto usually without need for other affixing to it. Such surface gripping provision desirably also is accorded to the upper face 21 of the top or seat plate 20.

In the instance of FIGS. 1 to 3, the top plate 20 is of a somewhat greater area and extent both lengthwise and widthwise than the bed plate 10, so as to cover and project slightly beyond the periphery of the bed plate. Where the units are to be used beneath textile machinery and particularly looms, the operation of which is traditionally productive of considerable lint, fly or dust, the the top plate 20 may be provided entirely about the periphery with a dust-excluding skirt 22 terminating just short of the bottom level of the bed plate 10 and thus providing a vertical wall substantially closing off the interior of the unit.

The plates 10, 20 are dimensioned in area according to the machine, apparatus or other load to be seated on them. Thus in the instance of a weave loom the plate 20 in an actual device is 12 in. or slightly over in length and about 6 in. in width. This adapts to accommodate the standard feet of commercial loom frames, such as the well-known Draper and Crompton-Knowles looms, the feet of which vary in dimension widthwise of the looms, lengthwise in the views, in different loom models from sizes at 6 in., 7 in. and 8 in. up to a maximum of about 12 in., as represented by the several dotted line foot positions on FIG. 2 and marked a—a through d—d respectively. All of these are dimensioned in width at not over about 6 in., hence all being receivable on the seat plate 20 of the stated size.

As to vertical dimension or thickness the bed and the seat plates 10, 20 are selected to afford for the complete unit an overall height or vertical thickness not exceeding about 9/16 in. plus or minus 1/64 in. tolerance, including any operative spacing up to about 1/8 in. between the inner opposed faces of the steel plates proper.

In the example of FIGS. 1 to 3 the two elements of the plate pair 10, 20 do not rest directly against each other but are operatively spaced vertically by approximately 1/8 in. or less. This is accomplished by flat-faced bearings such as the discs or washer-like members 13, 13 symmetrically distributed horizontally and set in the locating wells or seating recesses 12, 12 earlier mentioned. Such recess may be bored in a one-piece bed plate 10. Manufacturing convenience is promoted, together with ease and accuracy of dimensioning by utilizing an initially separate upper bed plate 10b in which through temperatures are drilled. When such apertured plate is set on and rigidly united to the under bed plate 10a such apertures present the bearer seating wells 12, 12.

Where, as shown in FIGS. 1 to 3, the bed plate 10 is so formed of two sheet steel pieces flatwise stacked and welded together, as by spot or other welding, the bottom piece 10a may be of 5/32 in. stock and the overlaid one 10b of 3/32 in. sheet. Thus the plural-layer bed plate 10 has the preferred maximum thickness of but 1/4 in., producing with the 3/16 in. top plate 20 and a 1/8 in. vertical interspace a unit not exceeding the desired approximate 9/16 in. overall height.

The bearing members 13, 13 for seating in the wells 12, 12 consist of annular discs or washer-like members of a so-called self-lubricating composition of a hard and wear-resistant material such as various of the compositions commercially supplied by Du Pont, as for example under the trade name Kemloy, these generally having fibre glass or other inserted particles contributing to a long wearing life and semi-lubricating property. Merely by way of example, these bearing members are sized at about 2 in. outer diameter and 1 in. inner diameter, affording an annulus of 1 in. radius. The seating recesses or wells 12 are conformantly dimensioned, so as to receive the bearings 13 deposited flatwise within them with a loose fit.

For cooperation centrally with the respective bearings, of which later there may be any desired number other than the pair illustrated and distributed symmetrically over the horizontal area of the bed plate, the top or seat plate 20, in the FIG. 1 example, is provided at the under face with a like number of limiting plugs or abutment members 23. Such abutments or limit stops 23 are anchored in or upon the under face of the load-seating top plate 20, as by insertion or direct molding into receiving apertures therefor. They are constituted of suitable mildly resilient or semi-rigid composition, as for example nylon, and have a horizontal dimension predeterminedly less than the inner diameter of the bearer annuli 13, as for example 7/16 in. outer diameter for the plugs 23 in association with a 1 in. diameter for the central openings 14 of the bearings 13 These plugs or stops 23 are so located on the top plate 20 as to be concentric with the corresponding bearings when the bed and seat plates 10, 20 are in their average normal symmetrical position with respect to each other horizontally, as shown for example in FIG. 1. The depending extent of these stops 23 is determined with respect to the desired vertical spacing between the two plates and so that the bottom ends of the stops terminate at or just short of contact with the underlying top surface of the floor of the bearing wells 12 under a loaded status of the vibration control unit. Thus in the foregoing illustrative example the stop members 23 have downward extent from the underface of the top plate 20 not exceeding 5/32 in., namely the sum of the vertical interspace between the plates and the depth of the bearing-receiving recesses 12. As earlier noted, it will be understood that the top plate 20 rests flatwise on the bearing pieces 13, 13 which latter project slightly from the receiving recesses 12 and above the surface of the bed plate 10. The extent of projection of the bearings may be substantially as represented as in FIG. 3, in the normally loaded operative condition of the device, such vertical spacing being for example approximately 1/8 in. in an average loom installation.

From the foregoing in connection with the drawings it will be noted that in the assembled superimposed position of the bed and seat plates limited relative movement between them in the plate of the plates is provided for, by reason of the all-round spacing between the top plate stops 23 and the surrounding inner wall of the bearing annuli 13. In the particular example of FIGS. 1 to 3, such relative movement up to a maximum of about 7/16 in. plus a slight further amount under compression of the stop and bearing members is avialable, that is, approximately 1/2 in. overall in the direction of any diameter of the bearings, or about 1/4 in. in any radial direction outward from the common centers of the stops and the bearings. It is apparent that a reverse arrangement of the bearing discs 13 is available within the invention, such as rigidly secured them at the under face of the top plate 20 as by cementing or by threaded screws having the heads thereof countersunk into the under face of the discs. Other forms of wear-resistant flatwise opposed surfaces for the plate pair are illustrated and described with reference to subsequent figures of the drawings.

For counteracting the horizontal vibrational forces of loads such as looms and controlling them by reduction substantially to neutralization, novel resilient means are operatively disposed in new and improved correlation with the described plate pair. Such means are herein constituted by spring elements disposed for operation in or substantially in the plane of the plates and effective for opposing incipient and actual vibrations universally in all directions in that plane. These springs are of high quality spring steel, such as Swedish spring steel, and in overall conformation are shallow and of minimal extent in the vertical direction, i.e. perpendicular to the plate plane, so as to be contained within the preferred overall height of the units of about 9/16 in.

As viewed in plan, as in bottom plan in FIGS. 1 and 5, or in top plan as in FIG. 4, such springs or spring elements 30, 30 are of a generally flat elliptical or ellipsoidal form, with well rounded ends in the instance of FIGS. 1 to 3 or of a more angular or "akimbo" form in the other embodiments shown. The springs are constructed and arranged to oppose maximum vibration-absorbing resistance in the direction of the major vibrational forces inherent in the operation of the supported machine or apparatus, the particular shape and relative dimensioning with respect to the length and breadth of it accordingly being dependent on the particular load apparatus.

In the case of non-circular weave looms the major vibration producing motions are those of the picker sticks and the violently thrown and abruptly stopped shuttles, in the direction from side to side of the loom. In the views the supported loom is assumed to extend in the right and left direction, the width of the looms paralleling the major dimension or length of the plates 10, 20. At the same time there are substantial though less violent forces produced in the loom operation in the direction normal to that of the shuttle throw, attendant on the fore-and-aft motion of the lay beam and the beating up of the weft in the reed.

Thus for use as loom mounts the vibration controllers of the invention are constructed and arranged for major vibrational absorption in one direction, lengthwise of the plate pairs and widthwise of the loom, but also for counteracting vibration-producing forces normal to said direction, as well as angular forces in all intermediate directions in the horizontal plane and between those paralleling the longitudinal or the lateral axes of the unit.

In so forming and disposing the springs each individually, and the plurality thereof utilized in mounting the loom in its entirety, they operatively correlate the resistance to horizontal forces and force components both widthwise and fore-and-aft of the loom so as most effectively to oppose the theoretical principal vector or sum of the total diagram of such forces. Hence the devices importantly reduce and isolate or substantially neutralize all the horizontal thrust forces of a loom against the supporting floor or sub-structure.

In the example of FIGS. 1 to 3 each of the springs 30 consists of a single strip of high quality spring steel such as mentioned. Such strip is symmetrically formed into the more or less flattened oblate elliptical or ellipsoidal shape illustrated. As installed in a vibration control unit the edges of the springs generally parallel the plane of the plates, with the wider or side faces perpendicular thereto, i.e. vertical in the assembled position. The longer bows of each spring, that is, the two approximate half portions at the respective sides of the major spring axis, which extends transversely of the plates, are similarly shaped and opposed to each other. Likewise the half sections of the springs at opposite sides of the minor spring axis, which parallels the length of the plates, are also shaped similarly to and are in opposition to each other.

The springs 30 are operatively located relative to the adjacent end portions of the respective plates 10, 20, centrally thereof widthwise. As best seen in FIG. 2, noting also FIG. 3 the top plate 20 has fixed at the mid-region of the under face of the end margin a block 24 which may be integral with the plate 20 or rigidly fixed to it by welding or as by screw bolts 25, or otherwise. The under portion of this block 24 has formed in it a groove 26 extending across the block lengthwise thereof, i.e. transversely of the unit and paralleling the major axis of the corresponding spring 30, and having a vertical depth to receive and abuttively support the spring over at least a major portion of its height, which latter in the above-mentioned example may be about 3/16 in. or approximately the thickness of the plates. This groove 26 is of a length crosswise of the plates adapting it to receive the medial portion of the corresponding bow of the spring 30. The groove 26 is outwardly flared at the ends to allow for compression and expansion of the spring in the course of its vibration absorbing action. The spring is operatively held on the block 24 as by a pin or screw 27 central of the block and spring and extending through the latter.

At the opposite or inner long bow of each spring 30 the two ends thereof are aligned and brought symmetrically together preferably leaving a small gap for self-adjusting and thermal expansion purposes. Said ends of the spring are flatwise abutted against the adjacent end face of the adjacent plate, the bed plate 10 in FIGS. 1 to 3, and are operatively held relative to it by another anchor block or plate 28 affixed against the outer wall of the spring ends and secured to the bed plate 10 as by screws 29 extending through the anchor block 28, the respective spring ends and into the bed plate 10. At the opposite ends the block 28 is tapered along a flat arc, similarly as for the groove 26 to provide for operative working of the spring. As seen in FIGS. 1 and 3, the spring 30 as a whole is slightly tilted for operative conformity with the different levels of the bed and seat plates 10, 20, the grooving of the block 24 and the inner face of the block 28 being correspondingly formed to accommodate said spring positioning. Centrally within the space defined by the spring there desirably is located a plate limit stop 20S welded or otherwise rigidly secured at the under face of the top plate 20. The stop is positioned and dimensioned to permit the expectable normal range of relative movement between the plates as effected by the vibration creating forces of the load, and to act as a limiting stop against unusual excess stresses occasioned by some operative abnormality of the supported apparatus.

In some instances, as in the case of heavier loads and relatively violent forces productive of vibration, buffer means may be provided in cooperation with the main springs 30, 30 for further damping the imposed forces and absorbing the shock of approach to or actual contact of the relatively movable parts, as for example between the spring supporting blocks 28 and the corresponding opposed stop 20S in the form of FIGS. 1 to 3, and in similar fashion in the other embodiments of FIGS. 4 and 5, in which latter however the structure and arrangement of springs 300 is generally found self-sufficient even for extreme loads. In said partly diagrammatic FIG. 2a strong stiff resilient members such as heavy helical springs 35, 35 are interposed between said block 28 on the stationary bed plate 10 and the block 24 fixed on the top plate 20. One or more such springs are disposed to each side of and symmetrically with respect to the central minor axis of the corresponding primary spring 30, with the ends encircling and supported by pins or bosses 36, 37 aligned on said blocks 24 and 28. Such springs 35 are coordinated with respect to the maximum expectable interplate travel so as to approach or reach their limit of compression substantially at or just in advance of positive contact between stop 20S of the top plate 20 and the block 28 of the bed plate 10. In this instance as well as those of FIGS. 2, 4 and 5, such stops 20S, 110S or 220S may itself be of a heavily resilient rubberous or like composition.

Turning now to the example of FIG. 4 and the corresponding side elevation FIG. 7, in this instance the bed plate 110, shown as an integral one-piece steel sheet or plate, is somewhat larger than the seating top plate 120, thus in effect reversing the size relation as compared with the FIGS. 1 to 3 embodiment. These plates in general including the gripping bottom and top faces of the unit as a whole and the wear-resistant bearing means at the opposed faces of the plates, may be substantially as illustrated and described in said preceding example. Here the plate movement controlling springs 300 are of a torsion type, again of a general flattened elliptical over-all shape but with the united ends of the long bows formed by one or more coils 311 of the spring stock. Also at the central portions of the long bows the spring 300 is formed with at least one full turn or coil as at 312. These springs 300 are fashioned each from a single rod or heavy wire of circular or other cross-section and of good quality spring steel, selected with reference to the expectable forces to be opposed in the operation of the unit.

Each spring 30 is operatively held at and between the adjacent ends of the respective plates 110, 120. As shown, the outer long bow is positioned relative to the bed plate 110 as by a shallow post element shown as including a flanged bushing 314, see also FIG. 9, threaded or otherwise affixed, preferably removably, at the upper face of said bed plate 110 as by the screw stud 315 extended upwardly therethrough and into the bushing 314. The latter is dimensioned to receive the spring loop 312 about it and beneath the flanged head 316 of the bushing. At the opposite or inner long bow of the spring 300 it is affixed to the adjacent end face of the top or seat plate 120 substantially as shown in FIG. 4. For improved operative correlation with the spring the end face of said plate 120 is recessed in the manner of a shallow V as indicated at 121, in general parallel conformity with the adjacent spring bow. At the flattened central portion of the recess the aligned and otherwise free ends of the spring 300 are brought approximately together, desirably with an operative clearance gap, and there entered into anchoring apertures or seats 122, 122 extending in from opposite sides of a preferably integrally projecting central boss-like end portion 123 on the plate 120. Within the confines of the spring 300 a limit stop 110S is affixed to the bed plate 110 in generally similar fashion as for the stop 20S of FIGS. 1 to 3. In this example the difference in level as between the bed and the seat plates 110, 120 is accommodated by the spring itself, the central portions of the two long bows of the spring automatically coming at the correct level by reason of the lateral and coils 311 of the spring as previously described.

It will be noted, both with respect to the FIGS. 1 to 3 embodiment and that of FIGS. 4 and 7, that the lateral portions of the springs, those at the respective ends of the major spring axis, have a toggle-like or dog-leg relation to the intermediate and long bow portions of the springs. Thus in effect the lateral portions and the intermediate portions of the springs work in opposition to each other, e.g. compression of the lateral portions in the direction transversely of the unit tends to increase the bowing of the longitudinal portions, while forces longitudinal of the unit and counteracted by unbowing or straightening of the long bow portions tend to close the lateral portions. Thus in action the springs 30 and 300 are enabled in effect to "turn the corner" with respect to the longitudinal and the lateral vibration producing forces, counteracting them in any horizontal direction, that is, in the general plane of the plates and as if acting along the line of the vector sum of the total diagram of such forces.

As earlier noted the bearing means at the opposed inner faces of the plates may be variously provided, as by means including the washer-like bearing discs 13 of FIG. 1 and which bearing means are shown also in connection with FIGS. 4 and 7, as at 13, 13. Either in conjunction with such bearing discs or in lieu thereof the opposed inner faces of the plates may be provided with special wear-resistant bearing means consisting of a layer, coating or deposit of special composition thereat. In this connection the side elevational views FIGS. 6, 7, 8 will be understood as partly diagrammatic and not to scale; also for clarity the springs and anchor means to be installed on and between the plates as already described with reference to FIGS. 1 to 5 are omitted.

Such laminar inter-plate bearing provision is illustrated in FIG. 6 as located at the under face of the top plate 220 as at 221, in FIG. 7 as at the top face of the bed plate 110 as at 111, while in FIG. 8 such bearing surface formation is shown both on the bed plate 310 as at 311 and also on the top plate 320 as at 321.

Such flat bearing elements or means 111, 221 and 311, 321 may be pre-formed sheets or layers bonded as by cementing to that or those inner plate faces at which they are carried, or they may be molded, sprayed or otherwise directly applied to said faces as a deposit, lamination or coating thereon, and having a thickness of the order of about 0.002 to 0.003 in. Various highly wear-resistant and so-called self-lubricating materials may be employed for the purpose, such for example as Delrin as previously mentioned for the bearing rings 13, 13, which incidentally are also shown as utilized in the example of FIGS. 4 and 7, in combination with the plate surfacing means at 111. As presently advised the preferred material for said surfacing means is that as commercially supplied by Du Pont under the trade name Teflon and which is coated directly onto the inner surface of the upper or lower steel plate as the case may be. Such Teflon is first compounded with impregnating material tending to improve the overall wear-resistance and according additional self-lubricating capacity, such as graphites, fibre glass, particles of powdered bronze or molybdenum and others of like properties in the respects mentioned. If both adjoined plate surfaces are so coated, as in FIG. 8, which is found generally not necessary, the impregnation may be omitted with respect to one plate for avoidance of excessive slip capacity especially if the units are for supporting relatively light loads.

It will be understood that my invention, either as to apparatus or means, is not limited to the exemplary embodiments or steps herein illustrated or described, and I set forth its scope in my following claims:

I claim:

1. A vibration controlling mount for apparatus and machines such as looms that are subject to operational vibration in the horizontal plane, said mount comprising
a rigid bed plate having a non-smooth under face for gripping a sub-structure on which it is set,
a rigid parallel seat plate of like conformation and approximately similar area overlying the bed plate,
flat wear-resistant bearing means for and between the opposed faces of said plates and operatively affording for the seat plate the capacity for limited horizontal movement relative to the bed plate in all directions in the plane of the plates,
spring means installed at and operatively between the adjacent ends of the plates and having a shallow vertical extent such as to be contained within the overall vertical height of the mount as a whole,
said means comprising at each end of the mount a unitary symmetrically oppositely bowed spring of general oblate ellipsoidal form having major and minor axes normal to each other and with the major axis perpendicular to the major expected vibrational forces,
   the opposite bow portions of the spring at the respective sides of the major axis thereof being centrally anchored in line with the minor spring axis to the bed and to the seat plates respectively,
   the lateral portions of the spring being in toggle-like dog-leg relation to said bow portions,
   each said spring composed of rod-like spring steel stock and having at each end of the major axis at least one full convolution of the stock and also having medially of one long bow portion at least one convolution of the stock, the opposite ends of the spring-forming stock being adjoined medially of the other long bow portion,
   each spring being anchored to the adjacent end portions of the respective plates by means comprising a shallow post passed through the medial convolution of one bow portion and affixed to the vertically opposite plate portion and further comprising spring end receiving seats at the adjacent end of the other plate.

2. A vibration controlling mount for apparatus and machines such as looms that are subject to operational vibration in the horizontal plane, said mount comprising
a rigid bed plate having a non-smooth under face for gripping a sub-structure on which it is set,
a rigid parallel seat plate of like conformation and approximately similar area overlying the bed plate,
flat wear-resistant bearing means for and between the opposed faces of said plates and operatively affording for the seat plate the capacity for limited horizontal movement relative to the bed plate in all directions in the plane of the plates,
spring means installed at and operatively between the adjacent ends of the plates and having a shallow vertical extent such as to be contained within the overall vertical height of the mount as a whole,
said spring means disposed at axially opposite marginal portions of the bed and seat plates and having major axles paralleling the adjacent margins thereof,
and means securing operatively opposite portions of the spring means to the bed plate and to the seat plate at locations above the bottom surface and below the top surface of said plates respectively and in a manner whereby the individual spring each as a whole is tilted for maximum operative conformity with the different levels of said plates at which they are secured and the entirety of the springs and said securing means therefor is contained within the vertical compass between the top surface of the seat plate and the bottom surface of the bed plate while said top surface of the seat plate presents an overall flat load-receiving area adapting the mount for operative reception of a maximum size range of load-supporting elements such as the standard feet of various different commercial loom frames.

References Cited by the Examiner

UNITED STATES PATENTS

| | | | |
|---|---|---|---|
| 1,887,283 | 11/1932 | Brabson | 248—346.1 |
| 1,915,466 | 6/1933 | Lilly | 248—358 X |
| 3,115,323 | 12/1963 | Crandell | 248—20 |

FOREIGN PATENTS

| | | |
|---|---|---|
| 166,002 | 5/1950 | Austria. |
| 723,822 | 1/1932 | France. |
| 933,653 | 8/1963 | Great Britain. |

CLAUDE A. LE ROY, *Primary Examiner.*

FRANK L. ABBOTT, *Examiner.*

JOHN PETO, *Assistant Examiner.*